United States Patent
Kesselman et al.

(10) Patent No.: US 9,572,157 B2
(45) Date of Patent: *Feb. 14, 2017

(54) TECHNIQUES ENABLING DYNAMIC BANDWIDTH RESERVATION IN A WIRELESS PERSONAL AREA NETWORK

(71) Applicant: Intel Corporation, Santa Clara, CA (US)

(72) Inventors: Alex Kesselman, San Jose, CA (US); Yuval Bachrach, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,483

(22) Filed: Sep. 3, 2013

(65) Prior Publication Data

US 2014/0003402 A1 Jan. 2, 2014

Related U.S. Application Data

(63) Continuation of application No. 12/229,385, filed on Aug. 21, 2008, now Pat. No. 8,824,422.

(Continued)

(51) Int. Cl.
*H04W 72/04* (2009.01)
*H01Q 3/26* (2006.01)
(Continued)

(52) U.S. Cl.
CPC ........... *H04W 72/0453* (2013.01); *H01Q 3/26* (2013.01); *H04B 7/0682* (2013.01);
(Continued)

(58) Field of Classification Search
CPC ..................... H04W 72/0453; H04W 72/0446; H04W 84/10; H04W 28/26; H01Q 3/26; H04B 7/0682
(Continued)

(56) References Cited

U.S. PATENT DOCUMENTS 6,005,854 A * 12/1999 Xu ....................... H04B 7/2668
370/335
7,567,543 B2 * 7/2009 Cao et al. ..................... 370/338
(Continued)

FOREIGN PATENT DOCUMENTS

CN 1610440 A 4/2005
EP 1524798 A1 4/2004
(Continued)

OTHER PUBLICATIONS

Office Action Received for Japanese Patent Application No. 2010-549942, mailed on Apr. 1, 2014, 2 pages of Japanese Office Action and 2 pages of English Translation.
(Continued)

*Primary Examiner* — Mohammad Anwar
(74) *Attorney, Agent, or Firm* — Sutherland Asbill & Brennan LLP

(57) ABSTRACT

An embodiment of the present invention provides a method, comprising dynamically reserving free channel time blocks for directional transmissions in a wireless personal area network (WPAN) by a transceiver communicating with a Coordinator and the Coordinator allocating a part or a whole of unreserved channel time blocks for a directional link during a handshake with the transceiver.

12 Claims, 3 Drawing Sheets

Related U.S. Application Data

(60) Provisional application No. 61/035,480, filed on Mar. 11, 2008.

(51) Int. Cl.
*H04B 7/06* (2006.01)
*H04W 28/26* (2009.01)
*H04W 84/10* (2009.01)

(52) U.S. Cl.
CPC ........ *H04W 72/0446* (2013.01); *H04W 28/26* (2013.01); *H04W 84/10* (2013.01)

(58) Field of Classification Search
USPC ........................................ 370/336, 329, 338
See application file for complete search history.

(56) References Cited

U.S. PATENT DOCUMENTS

| | | | |
|---|---|---|---|
| 2003/0179756 A1* | 9/2003 | Cain | H04B 7/0491 370/395.42 |
| 2005/0068902 A1* | 3/2005 | Rath | H04W 84/02 370/256 |
| 2005/0141451 A1 | 6/2005 | Yoon et al. | |
| 2007/0248072 A1* | 10/2007 | Kwon et al. | 370/345 |
| 2007/0253391 A1* | 11/2007 | Shao et al. | 370/338 |
| 2007/0286140 A1 | 12/2007 | Kwon | |
| 2008/0095072 A1 | 4/2008 | Shao et al. | |
| 2008/0112370 A1* | 5/2008 | Kwon | 370/336 |
| 2008/0175199 A1 | 7/2008 | Shao et al. | |
| 2009/0080366 A1 | 3/2009 | Shao et al. | |

FOREIGN PATENT DOCUMENTS

| | | |
|---|---|---|
| JP | 2009-505290 A | 2/2009 |
| JP | 2009-526550 A | 7/2009 |
| JP | 2009-534908 A | 9/2009 |
| JP | 2009-539300 A | 11/2009 |
| JP | 2009-540658 A | 11/2009 |
| JP | 2010-525651 A | 7/2010 |
| WO | 03/026221 A1 | 3/2003 |
| WO | 2007/123317 A1 | 11/2007 |
| WO | 2007/142443 A1 | 12/2007 |
| WO | 2007/142444 A1 | 12/2007 |
| WO | 2008066363 | 6/2008 |
| WO | 2009/114604 A2 | 9/2009 |
| WO | 2009/114604 A3 | 12/2009 |

OTHER PUBLICATIONS

Extended Search Report Received for European Patent Application No. 09720359.0. mailed on Mar. 27, 2014, 7 pages.
Office Action Received for European Patent Application No. 09720359.0 mailed on Apr. 15, 2014, 1 page.
Office Action Received for Chinese Patent Application No. 200910149711.4. mailed on Nov. 24. 2011. 4 pages of Office Action and 5 pages of English Translation.
Office Action Received for Chinese Patent Application No. 200910149711.4. mailed on Jun. 4. 2012. 4 pages of Office Action and 6 pages of English Translation.
Notice of Allowance Received for Korean Patent Application No. 2010-7020343. mailed on May 25.2012. 2 pages of Notice of Allowance and 1 page of English Translation.
Office Action Received for Taiwan Patent Application No. 98107659, mailed on Jul. 25, 2012, 5 pages of Office Action and 1 page of English Translation only.
Office Action Received for European Patent Application No. 09720359.0. mailed on Oct. 22, 2010, 2 pages of Office Action.
Office Action Received for Korean Patent Application No. 2010-7020343, mailed on Oct. 24,2011,2 pages of English Translation only.
International Preliminary Report on Patentability Received for Patent Application No. PCT/US2009/036779, mailed on Sep. 23, 2010, 6 pages.
International Search Report and Written Opinion received for PCT Patent Application No. PCT/US2009/036779, mailed on Oct. 29, 2009, 11 pages.
Office Action Received for Chinese Patent Application No. 200910149711.4. mailed on Oct. 15, 2012, 3 pages of Chinese Office Action and 4 pages of English Translation.
Office Action Received for Chinese Patent Application No. 200910149711.4. mailed on Feb. 5, 2013, 4 pages of Chinese Office Action and 9 pages of English Translation.
Office Action Received for Japanese Patent Application No. 2010-549942, mailed on Aug. 14, 2012, 5 pages of Japanese Office Action and 6 pages of English Translation.
Office Action Received for European Patent Application No. 1416689.4. mailed on Sep. 15, 2014, 6 pages.
Office Action Received for European Patent Application No. 14166895.4. mailed on Oct. 20, 2014, 2 pages.
Office Action Received for Chinese Patent Application No. 200910149711.4. mailed on Jan. 5, 2015, 7 pages of Chinese Office Action and 9 pages of English Translation.
Office Action Received for Japanese Patent Application No. 2014-135778, mailed on Mar. 24, 2015, 4 pages of Japanese Office Action and 5 pages of English Translation.
Office Action Received for Chinese Patent Application No. 200910149711.4. mailed on May 27, 2015, 9 pages of Chinese Office Action and 12 pages of English Translation.
Office Action for Japanese Patent Application 2014-135778 mailed Jul. 21, 2015. 3 pages Japanese Office Action. 4 pages English Translation.
Office Action received for Chinese Patent Application No. 201310532541.4 mailed on Feb. 1, 2016, 9 pages and English translation, 6 pages.
2nd Office Action for Chinese Patent Application No. 2013/10532541.4, mailed Oct. 17, 2016, 15 pages (6 pages or CN OA, 9 pages for English Translation).
Appeal Decision for Japanese Patent Application No. 2015-20180, mailed Sep. 27, 2016, 25 pages (19 pages or JP OA, 6 pages for English Translation).

* cited by examiner

TECHNIQUES ENABLING DYNAMIC BANDWIDTH RESERVATION IN A WIRELESS PERSONAL AREA NETWORK

CROSS REFERENCE TO RELATED APPLICATIONS

The present application claims priority to U.S. patent application Ser. No. 12/229,385, filed Aug. 21, 2008, which in turn claims priority to U.S. Provisional Patent Application Ser. No. 61/035,480, filed Mar. 11, 2008.

BACKGROUND

The availability of 7 GHz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11 a/b/g/n and WiMedia UWB) because the required data rates far exceed the capabilities of these networks.

Thus, a strong need exists for improvements and new development in wireless personal area networks that operate in the 60 GHz band.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
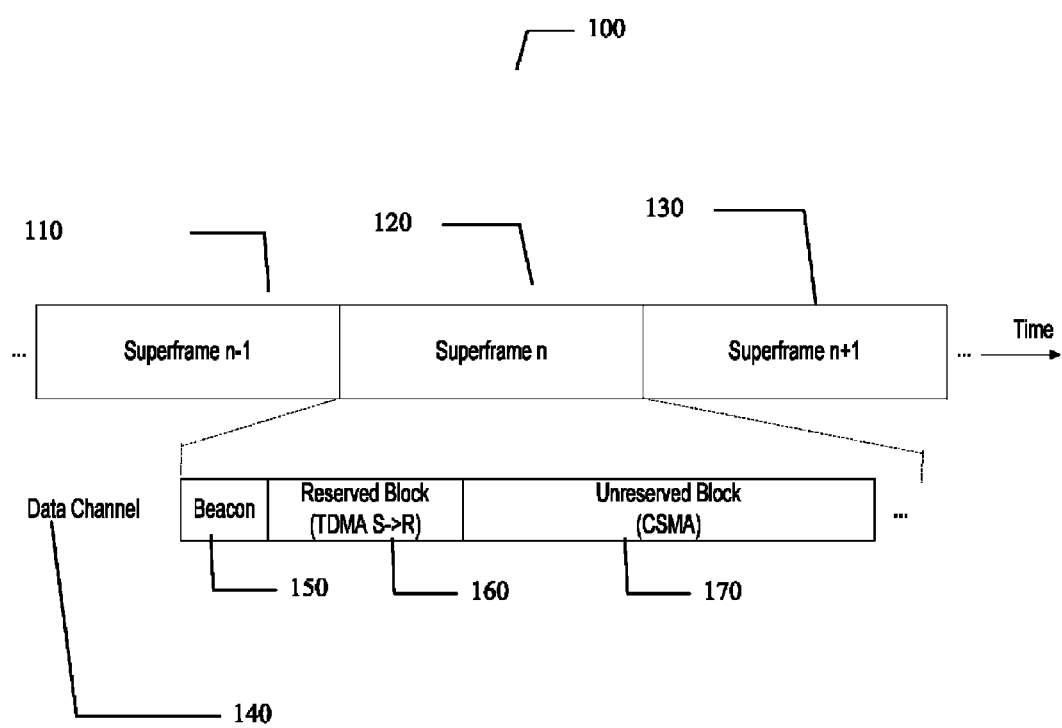
FIG. 1 provides an example of a super-frame schedule of an embodiment of the invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A millimeter (mm) wave communication link imposes more challenges in terms of link budget than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. In many cases, it is preferable to employ directional antennas for high-speed point-to-point data transmission. Devices performing directional transmissions can achieve higher range (mitigation for the link budget issue), as well as better aggregated throughput and spatial reuse, whereas certain pairs of devices separated in space can communicate simultaneously. A directional antenna pattern covering a wide range of angles to give omni-directional coverage may be employed to aid in neighbor discovery and beam-steering decisions. Furthermore, the antennae supported by devices can be of several types: Non-Trainable Antenna, Sectorized Antenna or Phased Array Antenna.

In a traditional 60 GHz WPAN, the channel time is scheduled using Time Division Multiple Access (TDMA) technology that does not support parallel transmissions. As seen in FIG. 1, generally shown as 100, channel time reservations are usually performed for each super-frame 110, 120 and 130 (the basic timing division for TDMA) by the Coordinator and communicated in the beacon frame 150. If a channel time block is reserved 160 for a specific pair of devices then the sender performs high-rate directional transmission. At the same time, if the channel time block is unreserved 170, it can be accessed using the CSMA (Carrier Sense Multiple Access) mechanism. Unfortunately, the CSMA mechanism necessitates using omni-directional transmissions that are rather inefficient and provide very low throughput. The existing medium access control (MAC) protocols allow reserving channel time blocks only starting from the next super-frame after the new schedule has been announced in the beacon 150. That incurs large delays for bursty data traffic, which adversely affects the application performance. On the other hand, reserving spare channel time for such traffic leads to poor channel utilization. An embodiment of the present invention provides a mechanism for dynamic reservation of free channel time blocks for directional transmission, which reduces the latency and increases the throughput of bursty data traffic.

Figure 2:
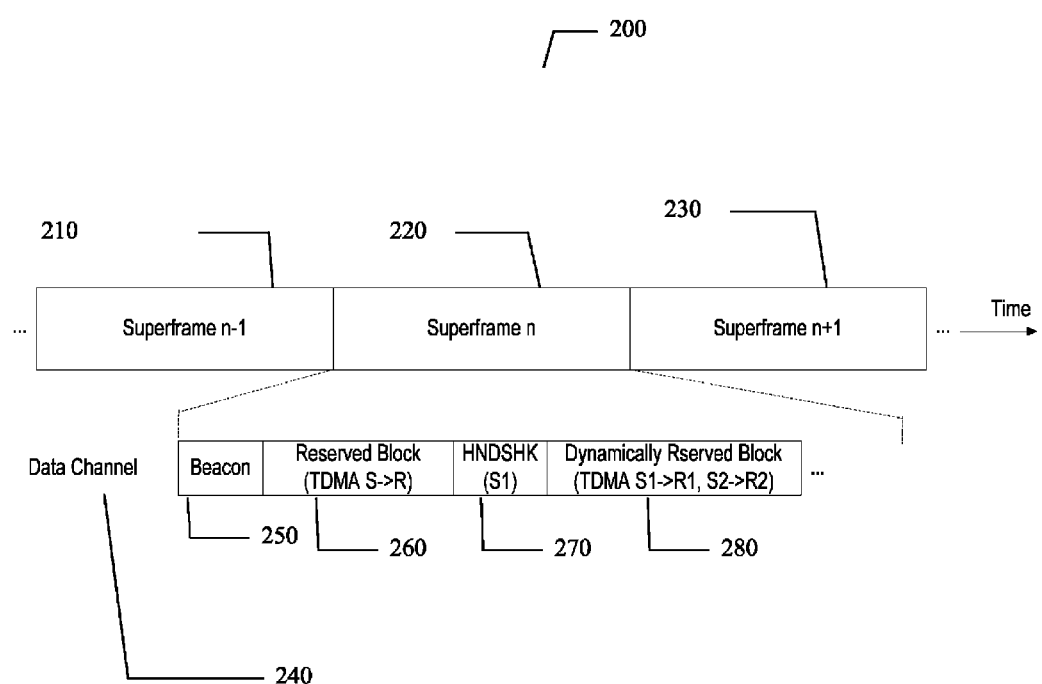
FIG. 2 provides a dynamic bandwidth reservation example an embodiment of the invention.

As shown in FIG. 2 at 200, an embodiment of the present invention provides a novel mechanism for dynamic reservation of free channel time blocks for directional transmission. Superframes are shown at 210, 220 and 230 with superframe 220 called out at 240 and including beacon 250, reserved block 260, handshake 270 and dynamically reserved block 280. During handshaking 270 with the sender, the Coordinator allocates a part or the whole unreserved channel time block for a directional link. The bandwidth allocation request specifying the reservation period is sent by the sender using omni-directional or directional transmission pointed toward the Coordinator. The Coordinator responds to the sender using (quasi) omni-directional transmission that must be received by the other devices with the bandwidth grant message that specifies the allocated reservation period, which can be less than or equal to that in the bandwidth allocation request. In embodiment of the present invention, but not limited in this respect, the Coordinator may also allow certain non-interfering links to utilize the allocated channel time block as specified in the bandwidth grant message.

Figure 3:
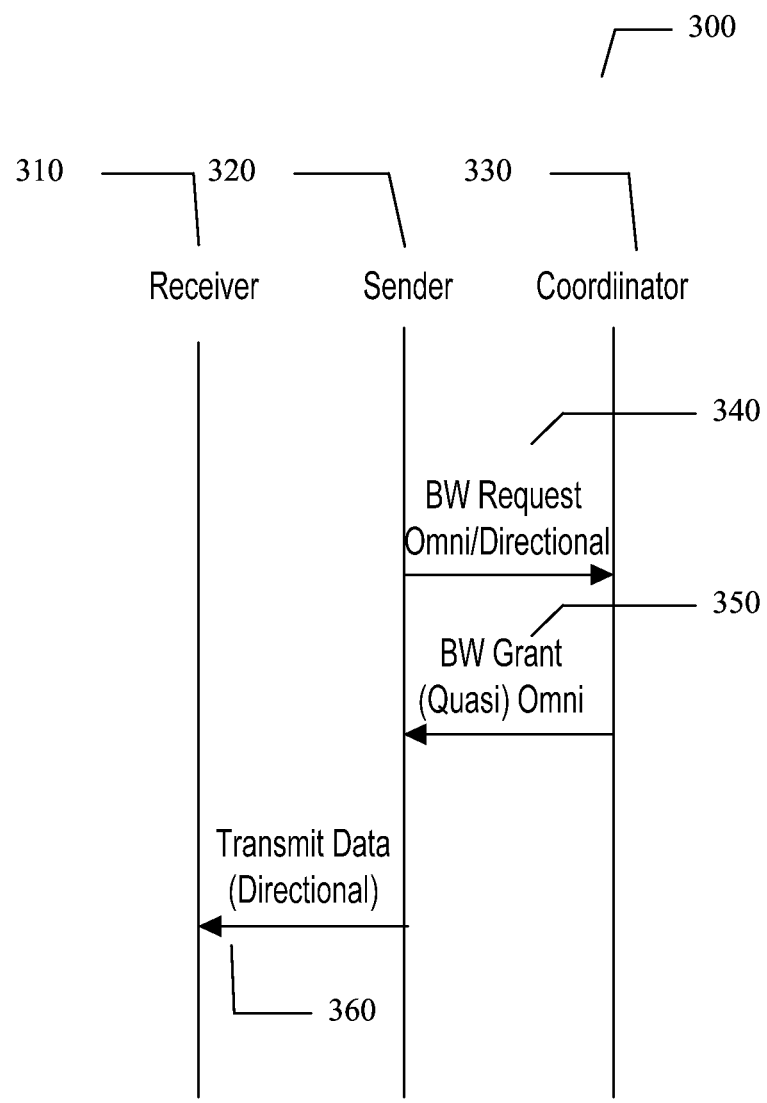
FIG. 3 illustrates a dynamic bandwidth reservation flow according to an embodiment of the present invention.

Looking now at FIG. 3 at 300, the message flow of the proposed mechanism is provided including receiver 310, sender 320 and coordinator 330. At 340 bandwidth request 340 is sent from sender 320 to coordinator 330 with a BW grant from coordinator to sender at 350. At 360 sender transmits (directional) data 360 to receiver 310. Further, in an embodiment of the present invention, the sender may itself act as the Coordinator and may need to just announce the grant.

As illustrated herein, embodiments of the present invention increase the throughput and decrease the latency for bursty data traffic. Further, the present invention maintains high channel utilization in presence of bursty data traffic and provides efficient channel sharing with constant and variable bit rate connections. It may also provide techniques for efficient spatial reuse and increases the capacity and the overall throughput of a WPAN.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus, comprising:
   a transceiver capable of operating in a wireless personal area network, wherein the transceiver is configured to
   receive, during a first period of a handshake sequence, a request for a reserved time for a directional link in the wireless personal area network, wherein the handshake sequence has a start time corresponding to initiation of the first period;
   transmit, during a second period of the handshake sequence, using omni-directional transmission, a grant message indicative of a grant of the reserved time for the directional link in response to the request, the second period after the first period; and
   schedule at least part of the reserved time for other directional links, at least one of the other directional links being non-interfering with the directional link;
   wherein the request, the grant message, and the reserved time all occur between two consecutive beacons transmitted by the apparatus, and
   wherein the handshake sequence has an end time prior to a start time of the reserved time.

2. The apparatus of claim 1, wherein the reserved time comprises previously unreserved free channel time blocks.

3. The apparatus of claim 1, wherein the request specifies the reserved time, and wherein the transceiver is further configured to receive the request via a directional transmission.

4. A method of wireless communications comprising:
   receiving, during a first period of a handshake sequence, a request for a reserved time for a directional link in a wireless personal area network, wherein the handshake sequence has a start time corresponding to initiation of the first period;
   transmitting, during a second period of the handshake sequence, using omni-directional transmission, a grant message indicative of a grant of the reserved time for the directional link in response to the request, the second period after the first period; and
   scheduling communications over a second directional link in the WPAN during the reserved time, the second directional link being non-interfering with the directional link;
   wherein said receiving, said transmitting, and the reserved time all occur between two consecutive beacons, and
   wherein the handshake sequence has an end time prior to a start time of the reserved time.

5. The method of claim 4, wherein the reserved time comprises previously unreserved free channel time blocks.

6. A machine-accessible non-transitory medium that provides instructions, which when executed, cause a machine to perform operations comprising:
   receiving, during a first period of a handshake sequence, a request for a reserved time for a directional link in a wireless personal area network, wherein the handshake sequence has a start time corresponding to initiation of the first period; and
   transmitting, during a second period of the handshake sequence, using omni-directional transmission, a grant message indicative of a grant of the reserved time for the directional link in response to the request; and
   scheduling communications over a second directional link during the reserved time, the second directional link being non-interfering with the directional link;
   wherein the request, the grant message, and the reserved time all occur between two consecutive beacons, and
   wherein the handshake sequence has an end time prior to a start time of the reserved time.

7. The machine-accessible non-transitory computer-readable medium of claim 6, wherein the reserved time comprises previously unreserved free channel time blocks.

8. An apparatus comprising:
   a transceiver capable of operating in a wireless personal area network, wherein the transceiver is configured to
   transmit, during a first period of a handshake sequence, a request for a reserved time for a directional link in a wireless personal area network, wherein the handshake sequence has a start time corresponding to initiation of the first period;
   receive, during a second period of the handshake sequence, subsequent to said transmitting, using omni-directional transmission, a grant message indicative of a grant of the reserved time for the directional link;
   transmit wirelessly during the reserved time; and
   schedule communications over a second directional link during the reserved time, the second directional link being non-interfering with the directional link;
   wherein the request, the grant message, and the reserved time all occur between two consecutive beacons, and
   wherein the handshake sequence has an end time prior to a start time of the reserved time.

9. The apparatus of claim 8, wherein the grant and the beacon are to be received from a same wireless communication device.

10. A method of wireless communications, comprising:
    transmitting, during a first period of a handshake sequence, a request for a reserved time for a directional link in a wireless personal area network (WPAN), wherein the handshake sequence has a start time corresponding to initiation of the first period;

receiving, during a second period of the handshake sequence, subsequent to said transmitting, using omni-directional transmission, a grant message indicative of a grant of the reserved time for the directional link;

scheduling communications over a second directional link in the WPAN during the reserved time, the second directional link being non-interfering with the directional link;

transmitting directional data during the reserved time;

wherein said transmitting the request, said receiving, and said transmitting during the reserved time all occur between two consecutive beacons, and wherein the handshake sequence has an end time prior to a start time of the reserved time.

11. A machine-accessible non-transitory medium that provides instructions, which when executed, cause a machine to perform operations comprising:

transmitting, during a first period of a handshake sequence, a request for a reserved time for a directional link in a wireless personal area network (WPAN), wherein the handshake sequence has a start time corresponding to initiation of the first period;

receiving, during a second period of the handshake sequence, subsequent to said transmitting, using omni-directional transmission, a grant message indicative of a grant of the reserved time for the directional link;

transmitting directional data during the reserved time; and scheduling communications over a second directional link in the WPAN during the reserved time, the second directional link being non-interfering with the directional link;

wherein said transmitting the request, said receiving, and said transmitting during the reserved time all occur between two consecutive beacons, and wherein the handshake sequence has an end time prior to a start time of the reserved time.

12. The machine-accessible non-transitory medium of claim 11, wherein said operations further comprise receiving the grant and receiving the beacons from a same wireless communication device.

\* \* \* \* \*